(12) United States Patent
Krimmer et al.

(10) Patent No.: US 6,889,708 B2
(45) Date of Patent: May 10, 2005

(54) VALVE COMPRISING A FILTER

(75) Inventors: Erwin Krimmer, Pluederhausen (DE); Wolfgang Schulz, Bietigheim-Bissingen (DE); Achim Meisiek, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 28 days.

(21) Appl. No.: 10/275,607
(22) PCT Filed: Mar. 15, 2002
(86) PCT No.: PCT/DE02/00953
§ 371 (c)(1), (2), (4) Date: Nov. 7, 2002
(87) PCT Pub. No.: WO02/075142
PCT Pub. Date: Sep. 26, 2002

(65) Prior Publication Data
US 2003/0172974 A1 Sep. 18, 2003

(30) Foreign Application Priority Data
Mar. 16, 2001 (DE) .......................................... 101 12 663

(51) Int. Cl.⁷ ................................................ E03B 3/18
(52) U.S. Cl. .......................... 137/545; 137/549; 123/510
(58) Field of Search .................................. 137/545, 549; 123/510

(56) References Cited

U.S. PATENT DOCUMENTS

| 5,699,773 A | * | 12/1997 | Kleppner et al. ........... 123/510 |
| 5,875,816 A | * | 3/1999 | Frank et al. ................. 137/549 |
| 6,058,913 A | | 5/2000 | Busato et al. |

FOREIGN PATENT DOCUMENTS

| DE | 10 01 073 B | 1/1957 |
| DE | 195 16 545 A | 11/1996 |
| DE | 199 01 090 A1 | 7/2000 |

* cited by examiner

Primary Examiner—A. Michael Chambers
(74) Attorney, Agent, or Firm—Michael J. Striker

(57) ABSTRACT

A valve (1) has a filter (18) integrated in the housing (3, 5), The filter is located in the vicinity of an intake-valve opening (9), by way of which a smaller physical size and a larger opening cross-section for an influent regeneration gas to the convergent-divergent nozzle results.

7 Claims, 3 Drawing Sheets

US 6,889,708 B2

VALVE COMPRISING A FILTER

BACKGROUND OF THE INVENTION

The invention is based on a valve with a filter.

A magnet valve is made known in DE 199 01 090 A1 that has a dirt-trapping device. This dirt-trapping device is situated concentrically around an armature plate of the valve and therefore increases the radial physical size. Additionally, an opening cross-section for influent regeneration gas is restricted toward the convergent-divergent nozzle.

The publication DE 195 16 545 A1 shows a valve for the metered introduction of volatilized fuel, in the case of which a filter is installed as a separate component in the vicinity of the intake. The filter must be sealed off from a housing wall and a magnet core.

SUMMARY OF THE INVENTION

In contrast, the valve according to the invention having the characterizing features of claim 1 has the advantage that a filter that reduces the radial physical size is situated in the valve in simple fashion. A larger opening cross-section for influent regeneration gas toward the convergent-divergent nozzle also means there is less of a pressure drop in the filter.

By locating the filter on the base of the housing, a smaller radial physical size is obtained in advantageous fashion.

The filter is advantageously designed in the shape of a labyrinth. The filter is thereby composed of ribs that are always arranged in such a fashion that a slit is formed between them having a maximum distance between them, at least in parts, by way of which foreign particles get stuck in said slit.

BRIEF DESCRIPTION OF THE DRAWINGS

Exemplary embodiments of the invention are presented in the drawings in simplified form and they are explained in greater detail in the subsequent description.

DESCRIPTION OF THE PREFERRED EMBODIMENTS

Figure 1:
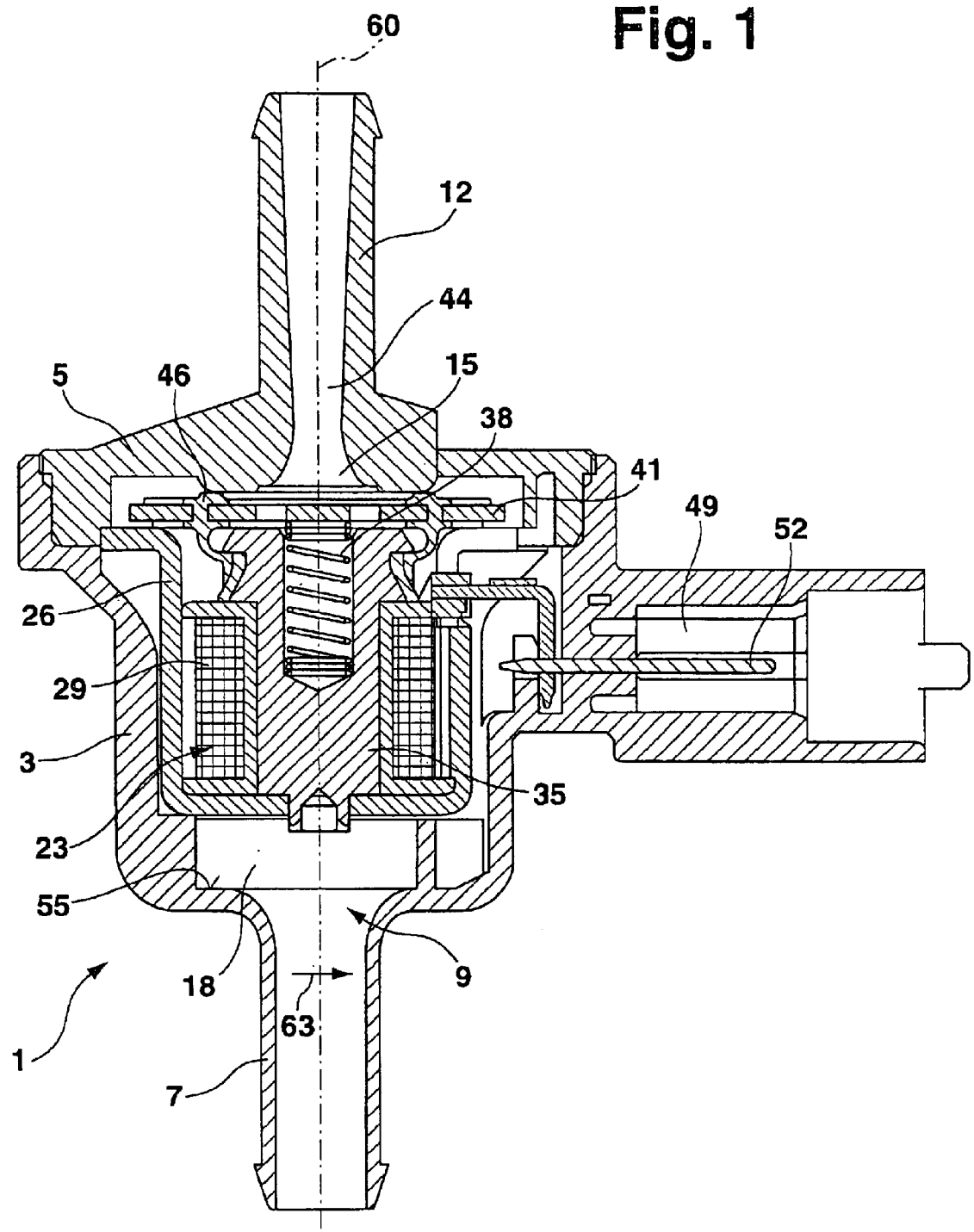
FIG. 1 shows a valve according to the invention.

A tank ventilation valve shown in a longitudinal sectional view in FIG. 1 as an exemplary embodiment of any type of valve, e.g., a magnet valve, is used for the metered addition of volatilized fuel from a fuel tank of a (not shown) mixture-compressed internal combustion engine with externally-supplied ignition into the internal combustion engine, e.g., into an intake manifold or, in the case of gasoline direct injection, directly into a cylinder of the internal combustion engine, and it is part of a not further shown evaporative-emissions control system of an internal combustion engine. The design and function of evaporative-emissions controls systems of this type are described in the "Bosch-Technische Unterrichtung Motormanagement Motronic", Ed. 2, Aug. 1993, pages 48 and 49, for example. A tank ventilation valve and its function are also described, for example, in DE 199 01 090 A1, which is expressly intended to be part of this disclosure.

The tank ventilation valve 1 has a plurality of housing parts, e.g., a double-component housing with a first housing part 3 that is designed in the shape of a cup, for example, and a housing part 5 that seals said first housing part and is designed in the shape of a cap, for example. The housing part 3 has an intake 7 for connection to a vent connection of the fuel tank, or to a tank for the volatilized fuel filled with activated carbon installed downstream from said fuel tank. The intake 7 has an intake opening 9 located in the region of a base 55 of the housing part 3.

The housing part 5 has an outlet 12 for connection, e.g., to the intake manifold of the internal combustion engine. Both the intake 7 and the outlet 12 are mounted on the housing parts 3 or 5, respectively, along an axial direction 60, for example.

An electromagnet 23 is located inside the cup-shaped housing part 3. The electromagnet 23 has a magnet housing 26 designed in the shape of a cup, for example, with a cylindrical magnet core 35 that is situated coaxial to the valve axis and penetrates the base of the cup, and with a cylindrical field coil 29 seated on a coil holder 32 that surrounds the magnet core 35 in the magnet housing 26. Located on its side facing the outlet 12 is an armature plate 41 that can be moved against the return force of a return spring 38, which said armature plate is attracted by the electric magnet 23 and forms a valve device that comes to bear against a seal seat located directly or indirectly against the housing part 5. The outlet 12 has a flow element 44 in the form of a convergent-divergent nozzle. It is understood, however, that the flow element 44 is not limited to a convergent-divergent nozzle and can also be developed as an orifice or a constriction. The flow element 44 is designed so that the surface of its narrowest flow cross-section is smaller than the surface of the opening cross-section of the seal seat 103. Furthermore, a diaphragm 46 is located on the armature plate 41.

The housing 3, 5 has a connector 49, for example, that is integral with the housing 3, 5 and has electrical end fittings 52 for connection to external plug contacts.

A filter 18 is located on the base 55 of the housing part 3 in the vicinity of the intake opening 9. The medium that can contain particles from the carbon filter, for example, flows through the intake opening 9 and through the filter 18—which retains these particles—past the magnet housing 26 in the direction toward the seal seat and, when the armature plate 41 is lifted, to the outlet 12.

Figure 2A:
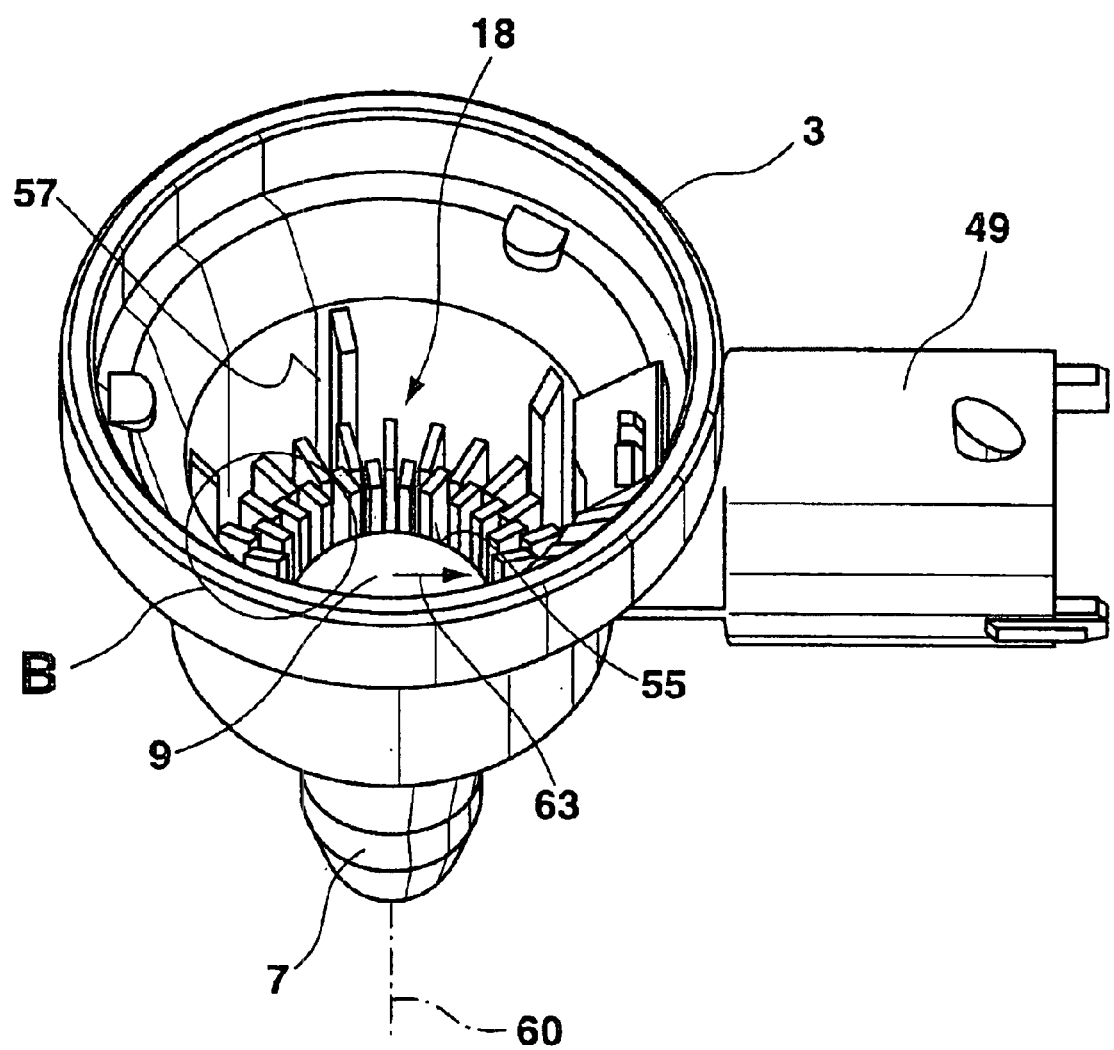
FIG. 2a shows a housing part with a filter of a valve designed according to the invention.

FIG. 2a shows the first housing part 3 of the valve 1 according to the invention with the filter 18. The filter 18 is located in the vicinity of the intake opening 9. The first housing part 3 has the base 55, which is bordered outwardly in a radial direction 63 by a housing wall 57 of the housing part 3. The base 55 is bordered toward the center by the intake opening 9. The filter 18 is located on the base 55, for example. Likewise, the filter 18 produced as one-piece with the housing 3, i.e., it is produced during manufacture of the housing 3, for example.

The magnet housing 26 is located, e.g., at least partially on the filter 18. The filter 18 is designed in the shape of a labyrinth, for example.

Figure 2B:
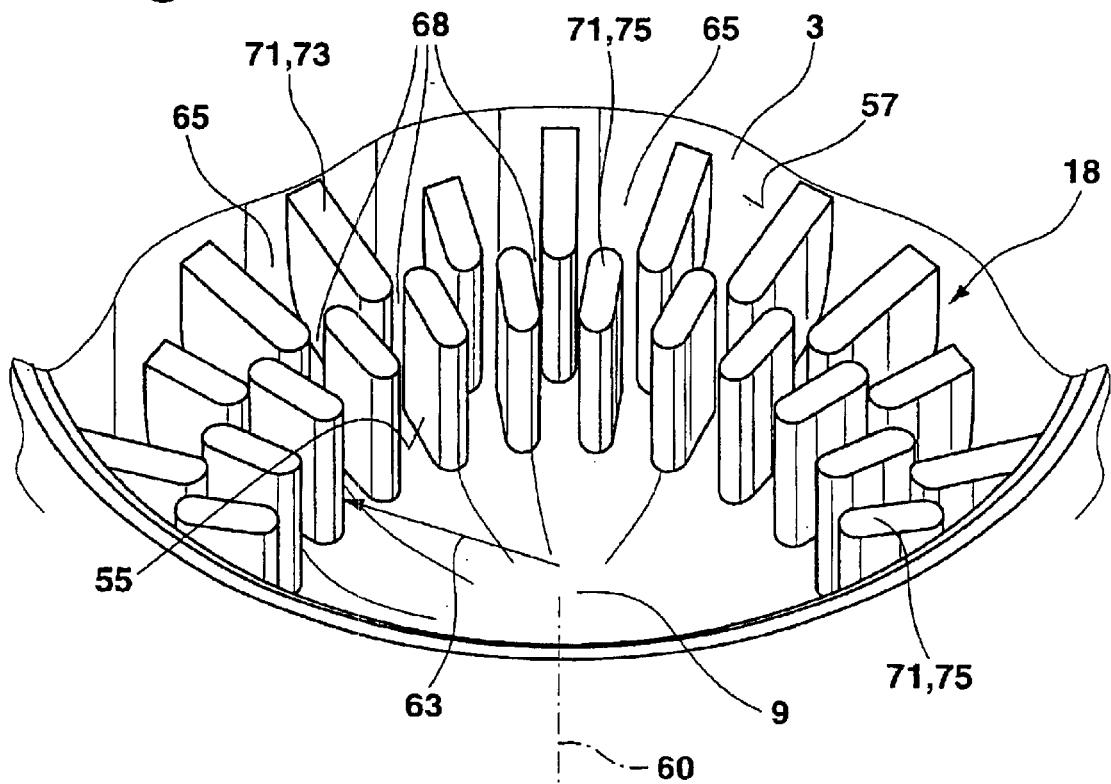
FIGS. 2b and 2c show a subsection of a housing part with different filters.

FIG. 2b shows an enlarged representation of a circle labelled "B" in FIG. 2a.

The filter 18 has at least one channel 65 and at least one slit 68 through which the medium flows, whereby dirt particles stick to the slits 68, as desired.

The filter 18 is composed of at least two, e.g., pad-shaped, oval, round, or similarly-shaped ribs 71 that extend in the axial direction 60 and that are arranged in such a fashion that they form the slit 68. The slit 68 has a width of approximately 0.2 millimeters, for example, so that particles larger than 0.2 millimeters in size stick to the slit 68. The width of the slit determines a minimum retention size of foreign particles.

The ribs 71 are arranged as follows, for example. At least two outer ribs 73 extend from the housing wall 57, starting at or in the vicinity of the housing wall 57, concentrically situated, in the radial direction 63 toward an intake opening 9. They have a certain height h in the axial direction 60, and a width b at a right angle to said height. The outer rib 73 extends radially up to a length I and, therefore, partially to the intake opening 9 on the housing base 55. The outer ribs 73 are located equidistant from each other in the circumferential direction on the entire circumference or nearly the entire circumference of the housing wall 57.

A channel 65 is formed between two directly adjacent, outer ribs 73.

Inner ribs 75 are situated radially offset in relation to the outer ribs 73, which said inner ribs can project partially into the channel 65 of the outer ribs 73. The shape of the inner ribs 75 is similar to that of the outer ribs 73 and they are also situated concentric around the intake opening 9 in the circumferential direction. The inner ribs 75 are located at a distance from the housing wall 57 and can extend to the intake opening 9.

The channel 65 is also formed between the directly adjacent, inner ribs 75.

The slit 68 extending in the radial direction 60 is formed between two outer ribs 73 and an inner rib 75, which said slit has a maximum distance in one location at the most. The slit 68 is therefore smaller or equal to the maximum distance in every other location, by way of which a lower limit is specified for a particle size that is retained at the least.

The medium flows out of the intake opening 9 through at least one channel 65 of the inner ribs 75 through a slit 68 into a channel 65 of the outer ribs 73. The foreign particles are retained in the slit 68. The ribs 73, 75 have the same height h in the axial direction. Only one part of the ribs 73, 75, at least three have a height that is greater than h by the maximum distance of, e.g., 0.2 mm or the slit width, so that the magnet housing 26 rests on these higher ribs 73, 75.

The filter 18 can also be designed in such a fashion that it is composed of pin-shaped ribs 71 that are located in uniform or non-uniform fashion on the base 55 and have a maximum distance between each other of, e.g., 0.2 mm. On the other hand, in place of the inner and outer ribs, the filter 18 can also be formed only by a row of ribs 71 situated side-by-side in the circumferential direction of the housing wall 57, which said ribs are separated from each other by a maximum distance of 0.2 mm, for example.

Figure 2C:
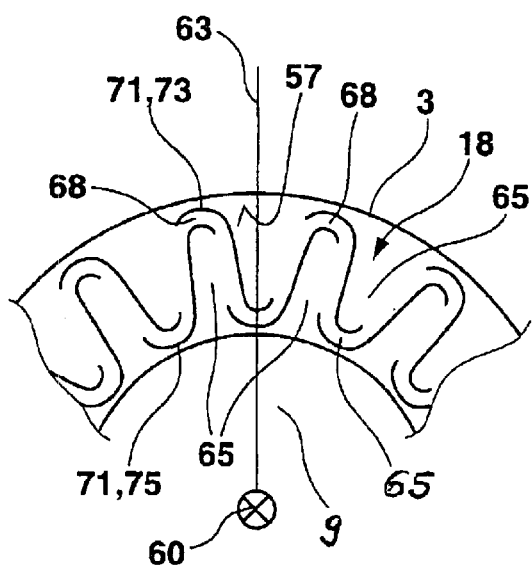

FIG. 2c shows a further exemplary embodiment of the filter 18. The ribs 71, 73, 75 are bent in comparison with FIG. 2b, e.g., they are shaped like an "S". Two directly adjacent ribs 73, 75 thereby form a channel 65 through which the medium flows from the intake opening 9 in order to move through the slit 68 in the direction toward the housing wall 57. From there, it flows along the housing wall 57 in the direction toward the outlet 12. The outer ribs 73 also form a slit 68 with the housing wall 57, for example.

What is claimed is:

1. A valve for tank ventilation in motor vehicles having an internal combustion engine, comprising:
    a housing, wherein an intake and an outlet are located on the housing, wherein the housing (3, 5) and the intake (7) are situated along an axial direction (60) of the valve;
    an intake opening (9) of the intake (7), wherein said intake opening (9) is located in region of a base (55) of the housing (3, 4), wherein a medium that contains dirt particles flows between the intake and the outlet at least part of the time;
    a filter that filters out the dirt particles, wherein the filter (18) is located in the housing (3, 5) concentric around the intake opening (9) of the intake (7), and the filter (18) is formed as one-piece with the housing (3, 5).

2. The valve according to claim 1, wherein the filter (18) is located on the base (55) of the housing (3, 5).

3. The valve according to claim 1, wherein the filter (18) is designed in the shape of a labyrinth.

4. The valve according to claim 3, wherein the filter (18) is composed of at least two ribs (71) that extend in the axial direction (60), whereby the directly adjacent ribs (71) form at least one slit (68) that has no more than one maximum width, at least in parts.

5. The valve according to claim 3, wherein the filter (18) is composed of at least two ribs (71) that extend in the axial direction (60), and at least one rib (71) and a housing wall (57) form at least one slit (68) that has a maximum width, at least in parts, and the directly adjacent ribs (71) form at least one slit (68) that has no more than one maximum width, at least in parts.

6. The valve according to claim 1, wherein the valve (1) is a magnet valve.

7. A valve for tank ventilation in motor vehicles having an internal combustion engine, comprising:
    a housing, wherein an intake and an outlet are located on the housing, wherein a medium that contains dirt particles flows between the intake and the outlet at least part of the time;
    a filter that filters out the dirt particles, wherein the filter (18) is located in the housing (3, 5) in the vicinity of the intake (7), and the filter (18) is formed as one-piece with the housing (3, 5), wherein the filter (18) is designed in the shape of a labyrinth, wherein the valve (1) has an axial direction (60), the filter (18) is composed of at least two ribs (71) that extend in the axial direction (60), whereby the directly adjacent ribs (71) form at least one slit (68) that has no more than one maximum width, at least in parts;
    wherein at least two outer ribs (71, 73) extend inwardly in the radial direction from a housing wall (57) or close to a housing wall (57) at least partially toward the intake opening (9), and at least one inner rib (71, 75) starting at a distance from the housing wall (57), extends inwardly in the radial direction no further than to an intake opening (9), at least one inner rib (75) is situated between the two outer ribs (73) in such a fashion that two slits (68) are formed that have no more than one maximum width, at least in parts.

* * * * *